Oct. 18, 1938.   G. W. PIERCE   2,133,645
ELECTRICAL SYSTEM
Filed Jan. 14, 1928

Inventor
George W. Pierce
By David Rivis
Attorney

Patented Oct. 18, 1938

2,133,645

UNITED STATES PATENT OFFICE 2,133,645

ELECTRICAL SYSTEM

George W. Pierce, Cambridge, Mass.

Application January 14, 1928, Serial No. 246,862

24 Claims. (Cl. 250—20)

The present invention relates to the reception of intelligence.

In the reception of electric signals, a receiving system is often employed comprising an electric circuit traversed by an oscillatory current of frequency such as to give audible beats with the received signal frequency. For this purpose, particularly when high-frequency waves are employed, it is important to keep constant the frequency of the receiving circuit. In the reception of radio-telephone signals, too, and also in other applications, it is useful to maintain a constant-frequency oscillation at the receiving station to beat superaudibly with the incoming signals for superheterodyne reception. In radio telephony and radio telegraphy, and in carrier-current systems where transmitting or receiving is effected by means of a carrier wave, also, the carrier frequency may be suppressed at the sending station, the side bands only being transmitted, and these must be supplied again with great accuracy at the receiving station.

The present invention has for its chief objects to provide an improved method of and system and apparatus for receiving electrical signals and to reduce interference to a minimum; also to provide for an accurate control of the receiving-station frequency. Other and further objects of the invention will be explained hereinafter, and will be particularly pointed out in the appended claims, it being understood that it is intended to cover in the appended claims all the novelty that the invention may possess.

Figure 1:
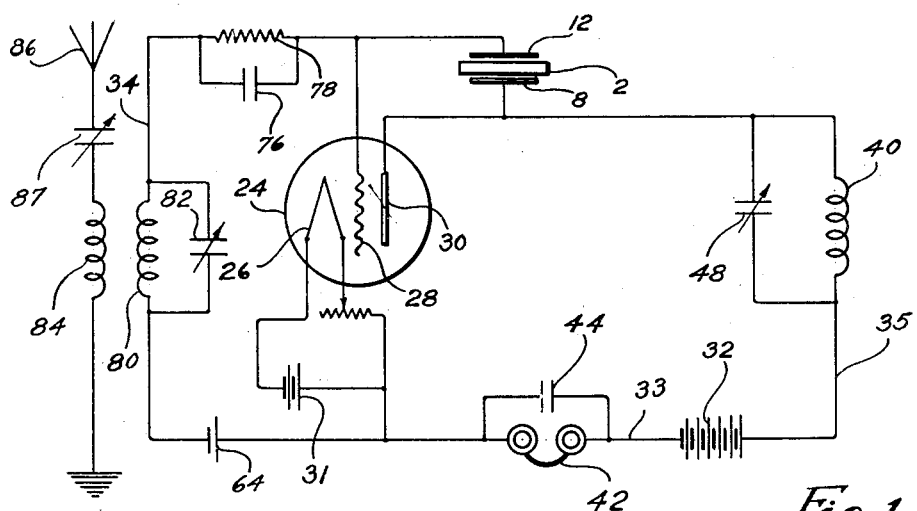
Figure 2:
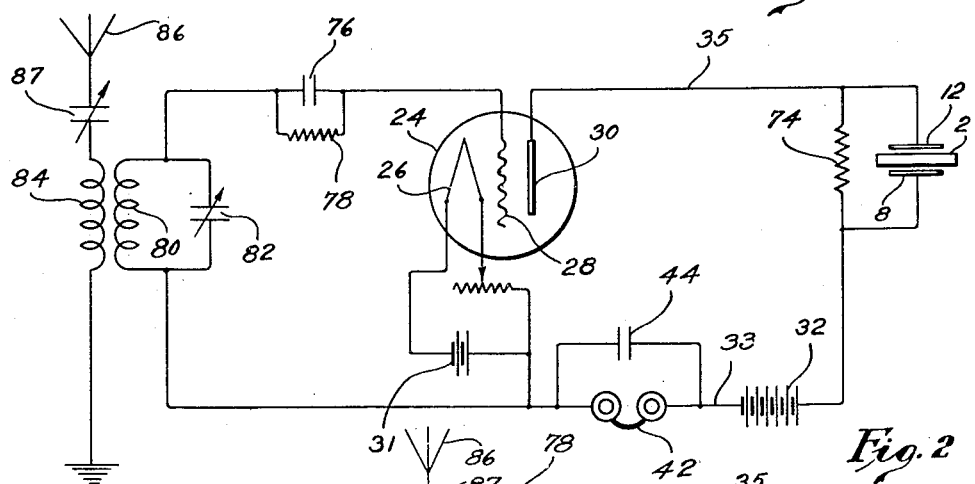
Figure 3:
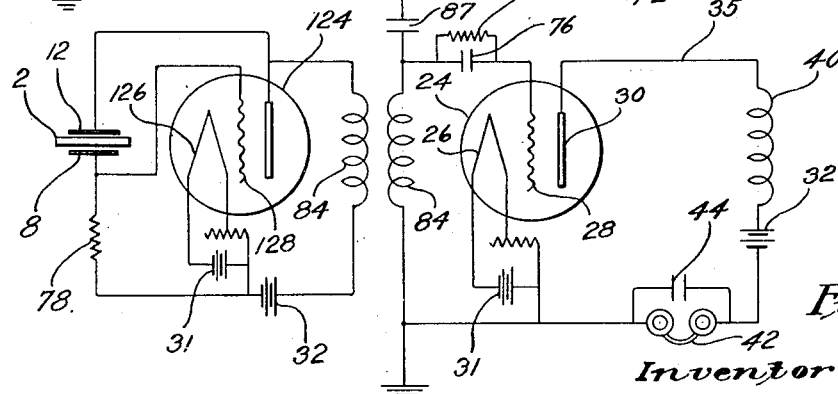

In the accompanying drawing, Fig. 1 is a diagram of circuits and apparatus illustrating the present invention in its preferred form; and Figs. 2 and 3 are similar diagrams of modifications.

The invention is illustrated as designed more particularly for radio-telegraph reception, but corresponding connections for receiving by radio-telephony or for telegraphing or telephoning over line wires will be obvious to persons skilled in the art. The constant frequency, according to a preferred embodiment of the present invention, is attained by the use of an electro-mechanical vibrator 2, like a piezo-electric crystal. Such vibrators have the property of executing mechanical vibrations under vibratory electrical stimulus and, conversely, of developing electrical potentials as a result of their mechanical vibrations, as is now well known, and as is fully explained in a copending application, Serial No. 695,094, filed February 25, 1924, of which the present application is a continuation in part.

For convenience, the action of the electric forces to cause mechanical deformation will be termed "stimulation" and the development of the electromotive force by the displacement will be termed "response".

Referring first to Fig. 1, the preferred receiving system of the present invention comprises a vacuum tube 24 provided with three sensitive elements or electrodes, namely, a filament 26, a grid 28, and an anode or plate 30. The filament 26 is connected with a filament-heating battery 31. A plate battery 32 is connected with the filament 26 by a conductor 33 and with the plate 30 by a conductor 35. A load 40, shown in the form of an inductance coil having a distributed capacity and resistance, is connected between the battery 32 and the plate 30. A tuning condenser 48 may be connected in parallel with the load, or the power of the system may, for some purposes, be increased by electrically tuning some other element. A blocking condenser 76, shunted by a leak resistor 78, and a winding 80, shunted by a condenser 82, are connected in the grid circuit, between the filament and the grid. The winding 80 is coupled to a winding 84 in series with a receiving antenna 86 and a condenser 87, and is grounded or connected with a counterpoise. The antenna 86 will receive the radio signals, which will be detected by a telephone receiver 42 disposed in the plate circuit of the tube, and which may be shunted by a bypass condenser 44. If desired, a grid-biasing battery 64 may be employed to bias the grid 28 to a predetermined potential, so that the potential of the grid may fluctuate about the biased value.

The locally generated oscillations of the circuits of the tube 24 will beat with the oscillations received by the antenna 86, according to well known principles, rendering the received signals audible in the telephone, or giving them any required superaudible frequency for superheterodyne reception. Owing to the variations in frequency of the oscillatory current traversing the circuits in systems as heretofore employed, however, reception of this character, particularly at high frequencies, has heretofore been very imperfect.

The oppositely disposed surfaces of the vibrator 2 are provided with opposed electrodes 8 and 12. One of the electric axes of the crystal 2 is assumed, for concreteness, to be in the direction of the thickness of the crystal plate. In the diagram of Fig. 1, the electrode 12 is shown connected with the grid 28 and the electrode 8 with the plate 30. Other connections may also be employed, as is explained in the above-described application. As shown in Fig. 2, the vibrator may be connected in the output circuit, between the filament and the plate, shunted by a bypass 74 for direct current. The bypass 74 may be a radio choke, an inductance winding, a resistor or a combination of these. The bypass 74 is preferably so chosen that the circuits shall have parameters such as to make the system stably nonoscillatory when the vibrator is removed or restrained from vibrating. The system will oscillate with a frequency determined by the frequency of some normal mode of mechanical vibration of the vibrator, and independent of the electrical parameters of the circuits.

A system of this character is adapted to receive high-frequency radiations, to which the electrical tuning elements are adjusted, and to superimpose upon them the frequency of mechanical vibration of the vibrator. The two frequencies are thus existent at the same time, permitting beats to be produced. The constancy of the beat note and the consequent certainty of being always in adjustment to receive the given signals is of great value, rendering possible the use of very high frequencies.

The beats render audible unmodulated telegraph signals. Superaudible beats may also be produced, in the case of telephone and telegraph reception, and these may be used for amplifying purposes, as in superheterodyne apparatus. The superposed frequencies may also be used to supply a carrier wave in a radio telephone system where the system operates by suppressed carriers. These results may be effected both in space-communication systems and in wire-communication systems. The invention is particularly useful where constant-frequency sources are used at the transmitting station and also at the receiving station.

The function performed by the piezo-electric crystal may be performed also by other vibrators similarly operating by internal stresses, such as the tuned magneto-strictive vibrator of United States Letters Patent No. 1,750,124, granted March 11, 1930, and all such vibrators will be included in the claims under the generic term "electro-mechanical vibrator" or its equivalent.

Instead of connecting the vibrator in the circuit of the tube 24, it may be connected in the circuit of a separate local oscillator tube 124, as shown in Fig. 3. The crystal vibrator 2 is shown connected between the grid 128 and the plate 130 of the tube 124, but it may also be connected between either of these tube electrodes and the filament 126. The plate circuit of the tube 124 may be coupled to the winding 84 of the antenna circuit by a winding 83. The signals received in the circuit of the tube 24 will beat with the local oscillations of the tube 124, producing the same result as before described.

The invention is readily adapted to power-amplifying systems, as is also explained in the before-mentioned application. All that would be necessary would be to replace the telephone 42 by suitable leads and an amplifier, as is well understood.

As before stated, the invention is equally applicable to radio telegraphy, to radio telephony with suppressed carrier and to telegraphy and telephony over line wires. Both in telegraphy and in telephony, the oscillations will be kept at practically constant frequency by the vibrator, making it possible, for example, to use a very high frequency, with all the advantages flowing therefrom. The oscillations may also be employed, with or without amplification, to serve as sources in carrier-wave systems, or to aid in the receiving apparatus of a carrier-wave system.

The vibrations of the electromechanical vibrator may also, in accordance with the present invention, be communicated to air or to some other elastic medium, as water, to produce sound for intercommunication or any other desired purposes.

Other uses and applications and other modifications within the scope of the present invention will also readily occur to persons skilled in the art. It is therefore desired that the above-described embodiments of the invention shall be regarded as illustrative of the invention, and not restrictive, and that the appended claims be construed broadly, except insofar as it may be necessary to impose limitations in view of the prior art.

What is claimed is:

1. An electric-wave receiving system having, in combinaiton, means for receiving signal waves from a remote source, a local system comprising a tube having a filament, a grid and a plate and having a piezo-electric crystal connected between the plate and the grid in such fashion as to maintain the frequency of the waves of the local system substantially constant, the connections being such as to prevent oscillations at other than the said substantially constant frequency, and means for combining the received waves with the local waves.

2. An electric-wave receiving system as defined in claim 1 in which the local oscillations are combined with one or both side bands of a modulated carrier wave.

3. A system as defined in claim 1 in which the crystal-controlled oscillator acts also as a detector.

4. A system as defined in claim 1 in which the crystal-controlled oscillator acts also as an amplifier.

5. In a system comprising a local system and employing the interference between electric currents set up by received energy and electric currents produced by the local system, an electromechanical vibrator connected with the local system for maintaining substantially constant the frequency of the said electric currents produced locally, the parameters of the local system having electrical characteristics such as to render the local system oscillatory under the control of the vibrator at a substantially constant frequency determined by a mode of vibration of the vibrator, and such as to render the local system stably non-oscillatory when not under the control of the vibrator.

6. An electromechanical system having, in combination, vacuum-tube apparatus comprising three electrodes, namely, a cathode, a grid and a plate, an electromechanical vibrator connected with two of the electrodes, the parameters of the system having electrical characteristics such as to render the system oscilatory under the control of the vibrator at a substantially constant, frequency determined by a mode of vibration of the vibrator, and such as to render the system stably non-oscillatory when not under the control of the vibrator, and means for exciting the system with a second frequency.

7. An electric-wave receiving system having, in combination, means for receiving signal waves, a local system having an electromechanical vibrator, the parameters of the local system having electrical characteristics such as to render the local system oscillatory under the control of the vibrator at a substantially constant frequency determined by a mode of vibration of the vibrator and such as to render the local system stably non-oscillatory when not under the control of the vibrator, and means for causing the local waves to beat with the received waves.

8. An electric-wave receiving system having, in combinaiton, means for receiving signal waves from a remote source, a local system comprising vacuum-tube apparatus comprising three electrodes, namely, a cathode, a grid and a plate, and an electromechanical vibrator connected with the local system, the parameters of the local system having electrical characteristics such as to render the local system oscillatory under the control of the vibrator at a substantially constant frequency determined by a mode of vibration of the vibrator and such as to render the local system stably non-oscillatory when not under the control of the vibrator, and means for causing the local waves to beat with the received waves.

9. An electric-wave receiving system having, in combination, means for receiving signal waves from a remote source, a local system having a piezo-electric crystal, the parameters of the local system having electrical characteristics such as to render the local system oscillatory under the control of the crystal at a substantially constant frequency determined by a mode of vibration of the crystal and such as to render the local system stably non-oscillatory when not under the control of the crystal, and means for causing the local waves to beat with the received waves.

10. An electric-wave receiving system having, in combination, means for receiving signal waves from a remote source, a local system comprising vacuum-tube apparatus comprising three electrodes, namely, a cathode, a grid and a plate, a piezo-electric crystal connected with the local system, the parameters of the local system having electrical characteristics such as to render the local system oscillatory under the control of the crystal at a substantially constant frequency determined by a mode of vibration of the crystal and such as to render the local system stably non-oscillatory when not under the control of the crystal, and means for causing the local waves to beat with the received waves.

11. A self-oscillating detector comprising a vacuum tube having a plate, a filament and a grid, an inductance interconnecting the plate and the filament, a second inductance interconnecting the grid and the filament, and a piezo-electric device opposite sides of which interconnect the plate and the grid to maintain the frequency of the self-sustained oscillations constant.

12. A radio receiving system including a self-oscillating vacuum tube detector having a piezo-electric crystal coupling its input and output circuits.

13. A signal-receiving system comprising, in combination, a local system comprising an electron tube circuit, means for impressing a potential difference due to incoming signaling energy directly upon the plate circuit of said electron-tube circuit, a responsive device connected with the signal-receiving system, and a piezo-electric crystal connected with the grid circuit and having a frequency related to the frequency of the incoming signaling energy for deriving a beat frequency by combination of the effects of said piezo-electric crystal with the effects of said incoming signaling energy for actuating said responsive device, and the parameters of the local system having electrical characteristics such as to render the local system oscillatory under the control of the crystal at a substantially constant frequency determined by a mode of vibration of the crystal, and such as to render the local system stably non-oscillatory when not under the control of the crystal.

14. A signal-receiving system comprising, in combination, a local system comprising an electron tube having grid, filament and plate electrodes and grid and plate circuits, a piezo- electric crystal generator connected with said grid circuit, the parameters of the local system having electrical characteristics such as to render the local system oscillatory under the control of the crystal at a substantially constant frequency determined by a mode of vibration of the crystal, and such as to render the local system stably non-oscillatory when not under the control of the crystal, means for impressing incoming signaling energy directly upon said plate circuit, and a responsive device connected with the signal-receiving system, the frequency characteristic of said piezo-electric crystal being selected with respect to the frequency of the incoming signaling energy in such manner that a beat frequency is obtained between said incoming signaling frequency and the frequency of said piezo-electric crystal for operating said responsive device.

15. A signal-receiving system comprising, in combination, a local system comprising an electron tube having grid, filament and plate electrodes and grid and plate circuits, a piezo-electric crystal connected with said local system, the parameters of the local system having electrical characteristics such as to render the local system oscillatory under the control of the crystal at a substantially constant frequency determined by a mode of vibration of the crystal and such as to render the local system stably non-oscillatory when not under the control of the crystal, and a signal input system coupled to said plate circuit, said piezo-electric crystal being selected with respect to the frequency of incoming signaling energy for deriving a beat frequency therewith by the combination of the effects of said piezo-electric crystal and said incoming signaling energy.

16. A signal-receiving system comprising, in combination, a local system comprising an electron tube having grid, filament and plate electrodes and grid and plate circuits, a piezo-electric crystal connected with the grid circuit, the parameters of the local system having electrical characteristics such as to render the local system oscillatory under the control of the crystal at a substantially constant frequency determined by a mode of vibration of the crystal and such as to render the local system stably non-oscillatory when not under the control of the crystal, and circuits for impressing high-frequency signaling energy upon said plate circuit, whereby a beat frequency is produced between the incoming signal and the local oscillation controlled by said piezo-electric crystal.

17. A self-oscillating detector comprising, in combination, an electron-tube circuit, an input circuit for impressing a potential difference due to incoming signaling energy upon said electron-tube circuit, a responsive device connected with said electron-tube circuit, and a piezo-electric crystal connected with said electron-tube circuit and having a frequency related to the frequency of the incoming signaling energy for deriving a beat frequency for actuating said responsive device.

18. A self-oscillating detector comprising, in combination, an electron tube having grid, filament and plate electrodes, input and output circuits interconnecting said electrodes, a piezo-electric-crystal generator connected with said circuits, means for impressing incoming signaling energy upon said system and a responsive device connected with said circuits, the frequency of said piezo-electric crystal being selected with respect to the frequency of the incoming signal in such manner that a beat frequency is obtained between currents derived from said incoming signal and said piexo-electric-crystal generator for operating said responsive device.

19. A self-oscillating detector comprising, in combination, an electron tube having grid, filament and plate electrodes, input and output circuits interconnecting said electrodes, a piezo-electric crystal connected in said input circuit, the parameters of said self-oscillating detector having electrical characteristics such as to render said self-oscillating detector oscillatory under the control of the crystal at a substantially constant frequency determined by a mode of vibration of the crystal, and such as to render said self-oscillating detector stably non-oscillatory when not under the control of the crystal, and circuits for impressing high-frequency signaling energy upon said aforementioned circuits, whereby a beat frequency is produced by beats between the incoming signal and the oscillation produced by said self-oscillating detector controlled by said piezo-electrical crystal.

20. A signal-receiving system comprising, in combination, a local system comprising an electron tube having grid, filament and plate electrodes, an input circuit interconnecting said grid and filament electrodes, and a plate circuit interconnecting said plate and filament electrodes, a pair of parallel conductive plate members connected in said input circuit, a piezo-electric crystal positioned between said plate members for sustaining oscillations of a constant frequency in said circuits, the parameters of the local system having electrical characteristics such as to render the local system oscillatory under the control of the crystal at a substantially constant frequency determined by a mode of vibration of the crystal, and such as to render the local system stably non-oscillatory when not under the control of the crystal, and means for impressing incoming signaling energy upon said circuits for producing combination frequencies with said piezo-electric crystal oscillations.

21. An apparatus for producing combination-frequency oscillations comprising, in combination, a local system comprising an electron tube having grid, filament and plate electrodes, an input circuit interconnecting said grid and filament electrodes, and an output circuit interconnecting said plate and filament electrodes, circuits for impressing relatively high-frequency potentials across said grid and filament electrodes, a piezo-electric crystal connected across said grid and filament electrodes, the parameters of the local system having electrical characteristics such as to render the local system oscillatory under the control of the crystal at a substantially constant frequency determined by a mode of vibration of the crystal, and such as to render the local system stably non-oscillatory when not under the control of the crystal, and means for causing the current in the local system to react with said high-frequency current to produce combination frequencies.

22. In an electron-tube apparatus, the combination of a local system comprising an electron tube having grid, filament and plate electrodes, an input circuit interconnecting said grid and filament electrodes, and an output circuit interconnecting said plate and filament electrodes, means for impressing a relatively high frequency upon said circuits, and a piezo-electric crystal connected in said input circuit for simulaneously sustaining oscillations of a frequency differing from the frequency aforementioned, the parameters of the local system having electrical characteristics such as to render the local system oscillatory under the control of the crystal at a substantially constant frequency determined by a mode of vibration of the crystal and such as to render the local system stably non-oscillatory when not under the control of the crystal, for producing currents of combination frequency by reaction between the oscillations of the local system and the said impressed oscillations.

23. An electrical oscillator and detector comprising a vacuum tube having plate, filament and grid electrodes, a tuned circuit comprising inductance and capacity interconnecting the grid and filament electrodes, a second inductance interconnecting the plate and filament electrodes, and a piezo-electric device opposite sides of which interconnect the plate and grid electrodes to control the frequency of the self-sustained oscillations.

24. In a radio receiving system, in combination, means for receiving a given band of signals representing speech, an oscillator-detector tube having said receiving means in its input circuit, a mechanical vibrating body opposite sides of which are connected between the grid and the plate electrodes of said tube, said body coupling the input and output circuits of said tube and controlling the oscillations of said tube, means for controlling the amplitude of the vibrations of said body, and means for deriving the speech signals resulting from beating the received band of signals and the current resulting from the mechanical vibrations of said body.

GEORGE W. PIERCE.